Feb. 2, 1932. S. N. BUCHANAN 1,843,201
FIXTURE SUPPORT
Filed Dec. 30, 1927  3 Sheets-Sheet 1
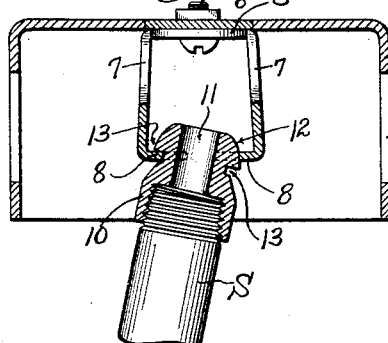
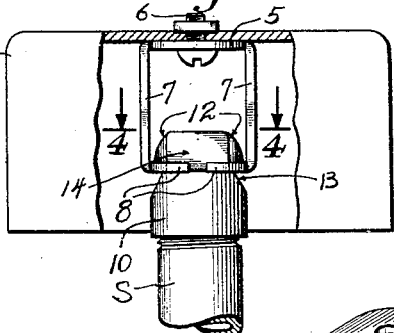
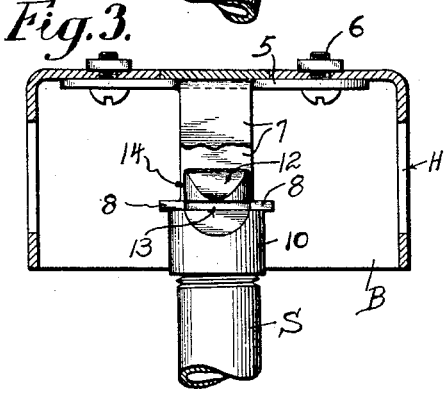
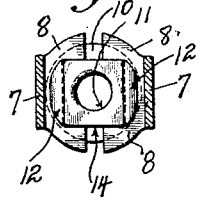
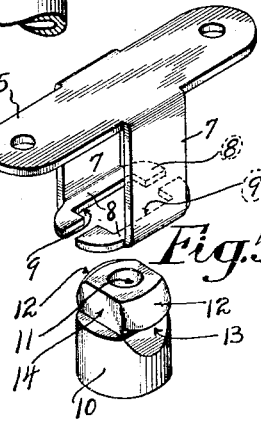
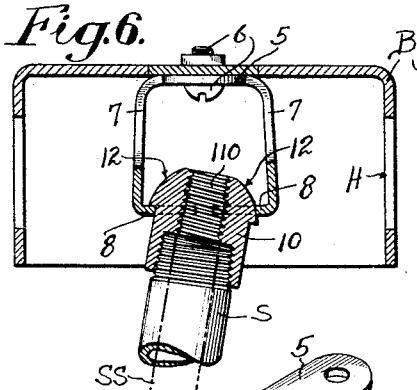
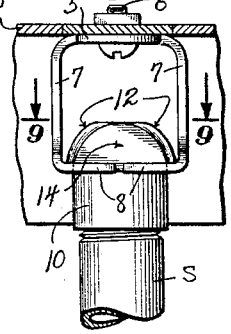
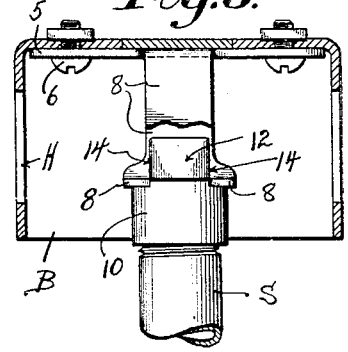
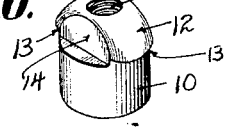
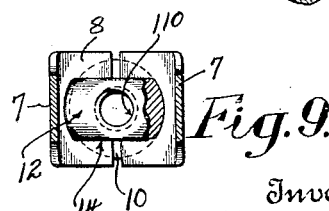
Inventor
STEPHEN N. BUCHANAN
By his Attorneys
Bohleber & Ledbetter Feb. 2, 1932. S. N. BUCHANAN 1,843,201
FIXTURE SUPPORT
Filed Dec. 30, 1927 3 Sheets-Sheet 2
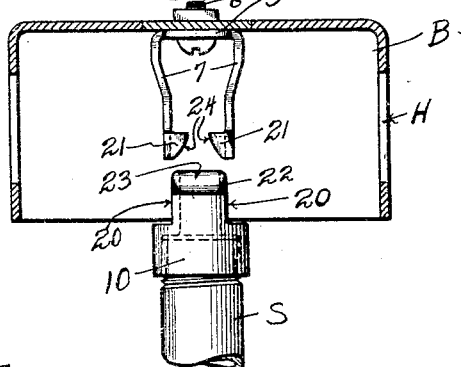
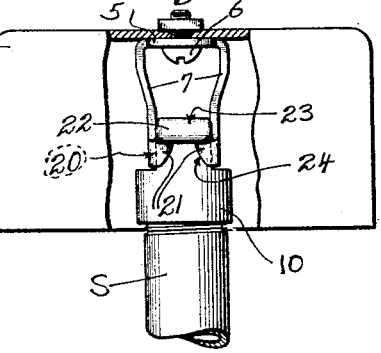
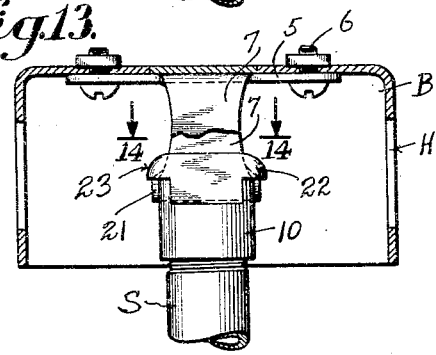
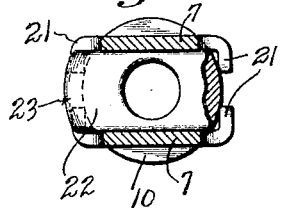
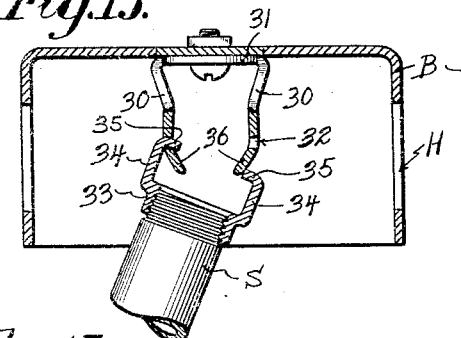
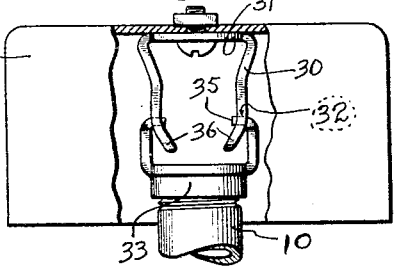
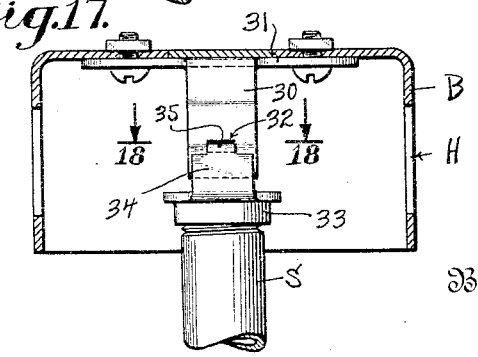
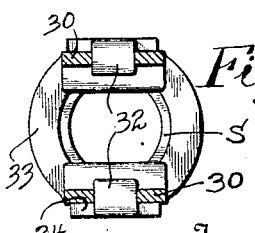
Inventor
STEPHEN N. BUCHANAN
By his Attorneys Feb. 2, 1932.  S. N. BUCHANAN  1,843,201
FIXTURE SUPPORT
Filed Dec. 30, 1927  3 Sheets-Sheet 3

Inventor
STEPHEN N. BUCHANAN
By his Attorneys

Patented Feb. 2, 1932

1,843,201

UNITED STATES PATENT OFFICE

STEPHEN N. BUCHANAN, OF NEW YORK, N. Y., ASSIGNOR TO THE THOMAS & BETTS CO., OF ELIZABETH, NEW JERSEY, A CORPORATION OF NEW JERSEY

FIXTURE SUPPORT

Application filed December 30, 1927. Serial No. 243,513.

This invention relates to supporting devices to hold lighting fixtures in service position and more particularly relates to a fixture support which carries the lighting fixture from an outlet box in house wiring systems.

A main object of the invention is to simplify the outlet box assembly and installation, reduce the number of parts, and speed the work; and to this end, my improved fixture support comprises in its preferred form a simple one piece device having box anchorage means at one end which is readily attached to a box, and having fixture anchorage means at its other end which readily attaches to a lighting fixture stem.

A lighting fixture outlet box assembly of present day use comprises a box, a fixture stud anchored to the box, and a hickey screw fastened to the fixture stud. A lighting fixture is attached to and supported from the hickey. By the use of my invention, the long used fixture stud and hickey are eliminated, and one part, namely my improved fixture support, is substituted therefor. In other words, my novel fixture support performs the function of the old stud and hickey, and my box assembly therefore comprises two parts only, a box and fixture support, which is an advantage and saves time, parts and material. My improved fixture support may well be called a hickey-stud since indeed it performs the office of both of these well known parts.

Another object is to produce a fixture support to which a lighting fixture stem is attached without screwing the two together. As now practiced in box assemblies, the lighting fixture stems are required to be turned to screw them onto the hickey, the latter being anchored to the box. The turning action snarls and twists up the wires so a workman on the job must complete the box assembly before he installs the wires, and conversely if the lighting fixture is to be removed, the wires must first be unsoldered and disconnected from each other in the box. My invention therefore provides means for directly attaching a lighting fixture stem to a box and I do so without turning the stem, which is an advantage in that the wires may be installed and connected in the box and run down thru the stem at any time because there is no turning of parts and hence no twisting of the wires.

I have shown several different examples of my fixture support, all of which may to advantage be stamped from sheet metal, preferably cold rolled sheet metal so that my fixture support is flexible or resilient to effect a spring-like plug-in connection with a lighting fixture member or stem.

The above and other objects of the invention and the means for their attainment will be more apparent from the description taken in connection with the accompanying drawings illustrating several examples thereof.

The first five views show one form of the invention in its simplest form, wherein the head of the fixture stem approaches and spreads open the arms of the fixture support by imparting a hooking plug-in angular motion to the fixture stem by the mechanic on the job.

Figure 1 is a section through a box assembly, i. e. a box with the fixture support anchored thereto, the fixture stem and its head having one side thereof hooked into the device and being positioned ready to spread the support arms and become snapped thereinto by an angular hooking motion.

Figure 2 is an elevation of the box assembly, the head and stem being in final locked position with the fixture support.

Figure 3 shows the box assembly, the box in section, the fixture support in elevation, an arm of the support being broken away to expose the stem head, and this view being taken at an angle of ninety degrees from the first two views thereby showing a side view of the device.

Figure 4 is a section on the line 4—4 of Figure 2.

Figure 5 shows the fixture support and its engaging lighting fixture stem head in separated perspective.

Figures 6 thru 10 show a second form of the invention essentially the same in principle as the first form except that the head carried on the lighting fixture stem is modified in several respects.

Figure 6 shows the box assembly in section with the head moving into anchored position with the support; Figure 7 shows the parts anchored; and Figure 8 is a view at ninety degrees from Figures 6 and 7. Figure 9 is a section on line 9—9 of Figure 7. Figure 10 is a perspective view of the fixture support and lighting fixture stem anchorage head in spaced alignment ready to be anchored together by a plug-in movement imparted to the head.

Figures 11 thru 14 show a third form of the invention, the free jaw-like ends of the fixture support and the head being modified in certain respects.

Figure 11 shows the fixture stem head approaching the arms of the support, and in Figure 12 the parts are snapped together; Figure 13 is a side view with one support arm broken away to expose the head; and Figure 14 is a section on line 14—14 of Figure 13.

Figures 15 thru 18 show a fourth form of the invention wherein the lighting fixture member or stem head is also made with arms or in yoke form and it may also be made of sheet material, whereas in the first three forms of construction the stem head is usually cast.

Figure 15 shows the stem head approaching the fixture arms at an angle in a hook-like motion; and Figure 16 shows the parts snapped together. Likewise Figure 17 shows the parts snapped together and is a side view. Figure 18 is a section on line 18—18 of Figure 17.

Figures 19 thru 22 show a fifth form of the invention wherein a cast-iron box may be used. This type of box is usually made with a threaded stud. My fixture support is therefore provided with an upper screw-threaded box anchorage end to engage the box stud.

Figure 19:
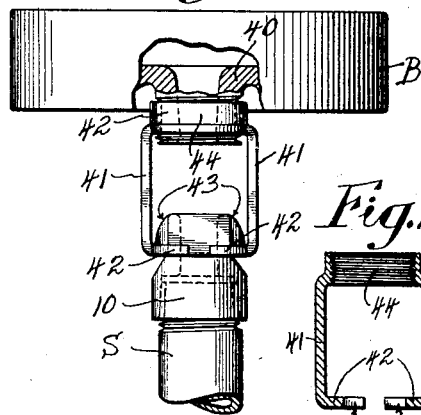
Figure 20:
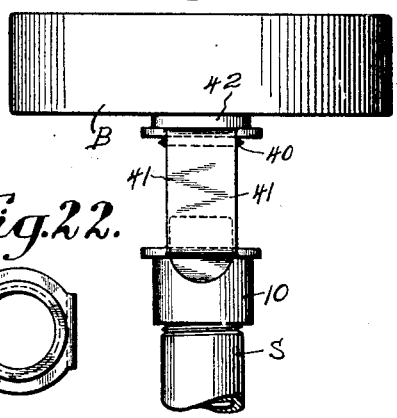

Figure 19 is a box assembly with the fixture support shown edgewise; and Figure 20 is a side view. Figure 21 is a lengthwise section of the fixture support; and Figure 22 is a top view thereof.

Figures 23 thru 26 show a sixth form of the construction, similar to the fifth form except here in the sixth form there is provided a locking ring to hold closed the jaws of the support arms, the latter being very long to reach thru a thick wall or deep box, or being long for other purposes and requirements met with.

Figure 23:
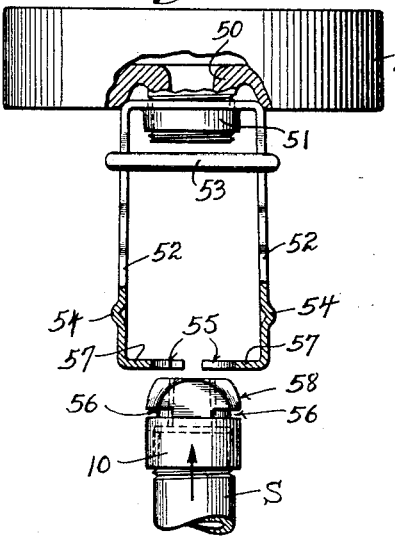
Figure 24:
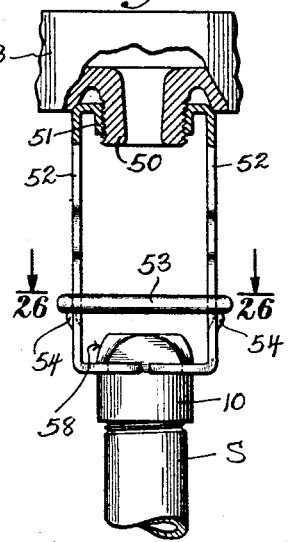
Figure 25:
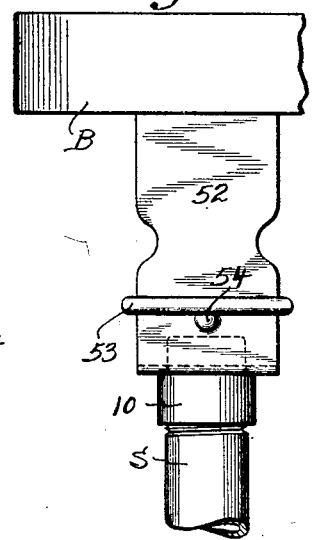
Figure 26:
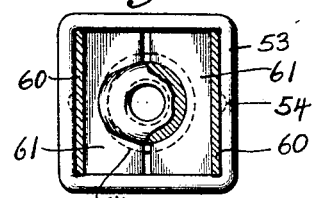

Figure 23 shows a box assembly but with the locking ring loose and the stem head separated from but about to engage the support arms; and Figure 24 shows the parts anchored together and the locking ring in down and final position. Figure 25 is a side view of the box assembly. Figure 26 is a view on the line 26—26 of Figure 24.

Figure 27:
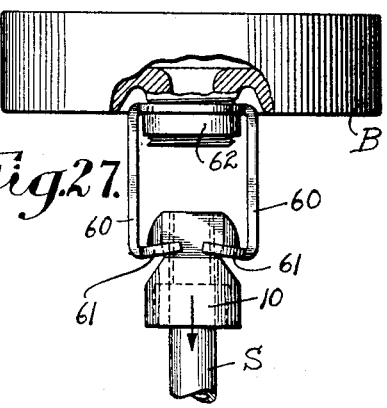

Figure 27 shows a seventh form of the invention wherein the lower free jaw-like ends of the support arms are turned up at an angle to engage the stem head with the result that the greater the weight on the stem, the greater is the tendency to draw the arms inwardly against the head.

In house and building wiring systems, outlet boxes B are provided and thru the knockout openings H thereof is received lead wires (not shown) which terminate in the box and the ends of which are connected with the fixture lead wires which extend down thru a fixture stem S to supply current to a lighting fixture (not shown) on the lower end of the stem S. My invention provides a simple and improved means to anchor the stem S to the box B without rotating the stem.

For all forms of the invention, I preferably fashion the support from cold rolled sheet metal with box anchorage means at one end which makes that end a rigid one, and with fixture stem anchorage means at the other end, the latter end including spring jaws or other means to grasp and clamp the fixture stem head. The material used imports resiliency to that end of the support which carries the jaws.

In the first two forms of construction (Figures 1 thru 10) there is shown a fixture support comprising a box anchorage foot 5 with screw holes 6 so the device can be anchored in a box by screws 6. The foot 5 carries integral arms 7 standing outwardly therefrom. The arms 7 are joined to and are rigid at the box anchorage end or foot 5, while the arms 7 are free and capable of springing or flexing action at their outer lower ends. Two arms 7 are found sufficient and they may be made parallel and at right angles to the box foot 5.

The outer or lower end of each arm 7 is bent inwardly to form shoulders 8 in the same plane and on which rests a head carried by the stem S. The shoulders 8 may be bent at right angles to the arms 7. There is formed a jaw opening or edge 9 in each shoulder 8. The full opening 9 defined by both shoulders 8 provides a jaw-like receptacle 8—9 for a head 10 which is pressed into the jaws of the arms and is positively held therein because the arms 7 spring closed underneath the head and the latter cannot be displaced.

Preferably the jaw opening 8—9 carried at the lower ends of the arms 7 is defined by lines or edges which are comparatively straight and intercept each other at an angle, and hence the head 10 which is similarly proportioned or is the counterpart thereof becomes locked against turning within the jaw opening 8—9 of the two-armed support. Two edges 9 of the receptacle means are parallel or substantially parallel to the direction of flex of the arms 7 or are perpendicular to the plane of the flexible arms 7 and thereby provide rigid and spaced edges or prongs on both sides of the head 12 which edges or prongs engage the flat surfaces 14 on the head to lock the parts against or prevent their rotation.

The head 10 is screw fastened on a lighting fixture stem S and is provided with a wire passage 11 thru which wires are carried thru the stem, and in the second form of construction a wire passage 110 is threaded to receive a small size stem SS if desired. The upper ends of the two heads shown in these two forms have an oval sliding contour 12 which rides under pressure exerted by the workman against the opposite jaw edges 9 to spread the arms 7 sufficiently to allow the enlarged head surface 12 to pass the shoulders 8 when the resilient arms snap the shoulders 8 into the oppositely disposed undercuts 13 in the head. This action is brought about by an angular movement forcibly imparted to the head 10 by the mechanic during assembly. This mode of inserting the head is shown in some of the views and ultimately locked position is shown in other views.

It is noted how one undercut or shoulder means 13 of the head is first hooked onto one shoulder 8 of one arm 7, whereupon the opposite slide surface 12 wedges and slides against the other arm and shoulder to spring the arms 7 apart until both undercuts 13 engage and rest on the top surface of the shoulders 8. The yoke arms 7 and the head 10 are therefore both provided with interlocking shoulder means 8 and 13, respectively, and the enlargement of the head above the undercut 13 in effect forms the shouldering means on the head.

Although the design of the undercut 13 and its interlocked engagement with the jaw opening 8—9 is such that the head 10 is fixed against rotation in the fixture support 5—7, nevertheless the head is in some forms made with parallel faces or a flat surface 14 which engages the edge of the jaw opening 8—9 and thus further and more firmly fixes the head against rotation relatively to the box B. The workman may then give the stem S a partial turn in order to bring the lighting fixture into proper position, but the principal feature about the installation is that the workman does not have to turn the stem S to screw fasten it onto the box. He simply plugs it in and thus the wires are saved from being twisted.

The shoulders 8 are formed with clearance between them so that the pressure which each arm exerts is fully spent against the head 10. After the stem head 10 is snapped into the hickey-stud or fixture support, it is permanently anchored therein but may be removed by prying open the arms 7. No play exists in the shouldered and undercut joint between the two parts and the connection is a rigid one, jaw-like in action, despite the fact that the shoulder ends 8 of the arms 7 are flexible or resilient to admit the fixture stem head 10 thereinto and to allow its removal should that be necessary.

In the third form of the invention (Figures 11 thru 14), a similar construction is availed of in that the resilient arms 7 are carried on a box anchorage foot 5 and the arms are separated at their free ends a distance about equal to the distance between the flat sides 20 of the head 10. Each arm 7 is made on its lower extremity with an inwardly directed jaw-like point or projection 21 which snaps under oppositely placed head lugs 22, the upper surfaces of which may be ovaled or rounded at 23 to easily slide up thru the separated jaw-like arms 7. The rounded lug surfaces 23 act against cooperating rounded surfaces 24 on the lower edge of the jaw points 21 to wedge open and spread the arms 7 apart for the entry of the head 10.

In this third form, one lug 22 is first hooked under one set of arm points 21, with the stem S tipped at an angle, whereupon the stem is forcibly swung into vertical position which causes the other lug to wedge open the arms 7 until both of the head lugs 22 rest on the top edge of the arm points 21. The weight of the stem S and of all parts carried by it is now resting on the points 21, the arms 7 having closed jaw fashion against the flat sides 20 of the head. Thus the parts are plugged together and are anchored against displacement, and no screwing or turning is necessary.

The fourth form of the invention is somewhat different from the preceding forms. In the first three forms the stem head 10 is forced into locked position by expanding and forcing the resilient arms 7 outwardly, but this fourth form utilizes the arms as in the other forms but differs therefrom in that a stem head 33 is here forced into position by contracting the resilient arms 30 inwardly or the head arms 34 outwardly. The principle involved is the same. In this modification, the resilient arms 30 of the fixture support are carried on the box anchorage foot 31, and an aperture 32 is formed thru the lower end of each arm 30. The stem head 33 is made with upstanding arms 34 which may be resilient if desired, and each of which carries an inwardly projecting lug 35 adapted to be sprung into the recesses or holes 32. The lower ends 36 of the arms 30 are set at an inwardly directed angle to the remaining arm portions so that the lugs or fingers 35 wedge thereagainst and contract or squeeze the arms 30 together to allow the four arms 30 and 34 to move from starting position as in Figure 15 to anchored and locked together position as in Figure 16. By pressing the arms 30 together, or by expanding the head arms 34, the head 33 is disengaged from the arms 30, and the stem S may be detached from the box B. This device satisfactorily supports the stem S and any fixture carried thereby.

A description will now be given of the fifth form of the invention shown in Figures 19 thru 22, wherein the box B is usually cast and is made with a threaded tubular fixture support stud 40 to which my improved fixture-support hickey is attached. In this form, the hickey comprises downwardly extending flexible arms 41 made at their upper ends integrally with a threaded stud anchorage sleeve 44. The lower ends of the arms 41 are turned inwardly to form shoulders 42 which engage the fixture stem head 10 attached to the stem S. The shoulders 42 are disposed in the same plane and are punched to provide inside jaw edges 43 for the reception of the upper end of the stem head 10.

The head 10 and cooperating jaw opening 43 are the counterpart of each other and may assume any suitable form. Preferably the co-operating jaw opening 43 and head 10 are designed and constructed with square or angular corners so as to lock the head against rotation within the arms 41. The head 10 is of course made with an upper bevelled surface 43 so that the head may wedge its way into the arms 41 and snap over the shoulders 42 so that the stem S hangs from the shoulders 42.

I have illustrated and described this fifth form of my invention so as to disclose how my improved fixture-hickey may be used in connection with cast boxes. In other words I have in this form of construction substituted the threaded box anchorage sleeve 44 for the flat anchorage foot 5 and 31 heretofore described. My fixture support may be used with any type of box because I provide a box anchorage end on my device for any type of box.

Coming now to a description of the sixth form of my invention, here again the box B is cast and is made with a depending tubular stud 50 on which is screw fastened a sleeve 51 on the upper ends of flexible arms 52, but any suitable form of box anchorage may be substituted for the sleeve 51 shown. In this form, the sleeve 51 may be turned down or into the arms 52. There are relatively long flexible hickey-support arms 52 because it is sometimes desirable to reach thru thick walls or ceilings of a building or reach thru very deep boxes.

In some cases, particularly where long arms 52 are employed, although the structure is equally well adapted for short arms, I slidably mount a locking ring 53 on the resilient arms 52. A stop boss 54 is pressed out from one or both arms near their lower ends to prevent the locking ring 53 from sliding off of the support. The head 10 carrying the stem S is plugged upwardly thru the jaw openings 55 so that the under-cut 56 formed in the head becomes interlocked with the shoulders 57. The upper end of the head 10 is preferably rounded at 58 so as to slide thru the jaw opening 55 and open the arms 52. Having snapped the head 10 into the jaw opening 55, the locking ring 53 is now moved downwardly to prevent the arms 52 from opening up and in this way the stem S is positively supported from the fixture hickey 52 and box B. The head 10 is removed from the fixture support 52 by sliding the locking ring 53 upwardly and spreading the arms 52.

Regarding further the sixth form of construction, it is also clear that the arms 52 may have a normal or unsprung position such that the head 10 passes between the shoulders 57 without requiring the forcing or springing.

As to the seventh form of my invention, there is shown in Figure 27 the lower ends of flexible fixture-hickey arms 60 modified in certain respects so that the weight of the lighting fixture hanging on the stem S tends to draw and bind the support shoulders inwardly toward the head 10. The upper anchorage end 62 of the support may be made in any suitable form as for example a sleeve 62 which is screwed onto the box B. The shoulders 61 are formed by bending the end of the flexible arms inwardly and upwardly, and the upper end of the head 10 is under-cut to form the same angle as that of each shoulder 61 so that a cooperating inclined plane acting in the nature of a wedge is provided. The heavier the weight on the stem S, the tighter the two angularly disposed shoulders 61 bear against the under-cut head.

On the lower end of the fixture support, there is provided various forms of lighting fixture member or stem head anchorage means by which a lighting fixture stem is quickly attached to the device and hence to a box without screwing the parts together. For example the jaw ends 9, 21, 42, 55 and 61, as well as the arm holes 32, all take the place of the hickey long in use.

I have provided short fixture arms in some forms of the invention and long fixture arms in other forms of the invention because it is desirable to provide a suitable fixture support for any lighting fixture which is required to be installed and many different types of boxes are encountered. In some forms of the invention, the fixture arms open up to receive the stem head thereinbetween jaw-fashion. In other forms, the fixture arms contract or close to receive the stem head. At any rate, the anchorage of a lighting fixture stem S to a box B is effected by quickly plugging the parts together and not by screw threaded connection which is difficult and unhandy because it twists up the wires.

The fixture support is open armed, i. e., its arms stand apart so as to afford a wide space through which to draw and handle the wires and make soldered connections between the wires which extend into the box B and the other wires which extend thru the stem S.

The lower flexible free ends of the arms in all the different forms are spaced apart to receive the lighting fixture support member 10 thereinbetween. The arm points 21, shoulders 8, 42, etc. are all adapted as retaining means to prevent the lighting fixture member 10 from being displaced therefrom.

According to all forms of the invention, my fixture support is made somewhat like a yoke, this being true of the construction in Figures 15 thru 18, while in all other forms of construction the free ends of the fixture support act much like a jaw because they snap closed on the stem head 10 when the latter is received between the resilient arms. The stem head 10 is made with the ovaled or rounded enlargement as shown throughout and is made with an equivalent means 35 as in the fourth form, the general purpose of which is to forcibly flex the arms and gain an interlocked anchorage therewith.

While I have shown in its preferred form a fixture support usually with two resilient arms, it is to be understood that a plurality of arms may be used to advantage without departing from the principle involved. The head 10 on the stem must be formed with a like number of cooperating shouldered portions as there are arms embodied in the fixture support.

The invention in its several aspects is presented to fill a need felt for simpler box assemblies and lighting fixture supports.

What I claim is:

1. A fixture support comprising, a support including a box anchorage means at one end, arms carried with the box anchorage means and so formed that the ends of the arms remote from the anchorage means are flexibly free, the flexibly free ends of the arms being bent inwardly at substantially 90° and recessed forming an opening therethrough with jaw-like edges on the bent-in portions to provide a receptacle means thereon, a device adapted as a lighting fixture support including shouldering means which are the counterpart of the jaw-like edges and a rounded wedging surface to engage and spread open the jaws, and parallel surfaces upon the device engaging the jaw-like edges of the receptacle means to retain the parts against rotation.

2. A fixture support comprising, box anchorage means and two flexible arms depending integrally therefrom, the ends of the arms being inturned toward each other and upturned toward the box anchorage means to form wedging shoulders, and a lighting fixture member having a wedging undercut formed at the same angle as the inturned and upturned ends of the arms, and said member including a rounded upper surface which slides against the arms and flexes them open.

3. A fixture support comprising, a threaded sleeve adapted to screw fasten onto a box boss, two oppositely disposed and spaced arms depending integrally from and bent over the sleeve so that the sleeve is between the arms, shoulders formed on the lower ends of the two arms by bending the ends of the arms inwardly and substantially at right angles to the arms to engage and hold a lighting fixture member, a locking device on the flexible arms to hold them closed against a lighting fixture member, a lighting fixture member having an axial wire opening therethrough, means to secure a lighting fixture thereto, and shouldering means upon the lighting fixture member for receiving the shoulders upon the lower ends of the arms.

4. A fixture support comprising box anchorage means, flexible arms depending therefrom, the arms being widely spaced to form wire passages therebetween, a lighting fixture member, means to support a lighting fixture therefrom, shouldering means upon the lighting fixture member, a wire passage through the member, means on the lower end of the arms which are spread apart and spring together to receive the shouldering means and retain the lighting fixture member, and a locking device slidably mounted on the flexible arms to hold them closed against the lighting fixture member.

5. A fixture support comprising box anchorage means, flexible arms depending therefrom, the arms being widely spaced to form wire passages therebetween, a lighting fixture member, means to support a lighting fixture therefrom, shouldering means upon the lighting fixture member, a wire passage through the member, means on the lower end of the arms which are spread apart and spring together to receive the shouldering means and retain the lighting fixture member, and a ring slidably carried on the outer surface of the flexible arms to fix the latter against opening.

6. A fixture support comprising box anchorage means, flexible arms depending therefrom, the arms being widely spaced to form wire passages therebetween, a lighting fixture member, means to support a lighting fixture therefrom, shouldering means upon the lighting fixture member, a wire passage through the member, means on the lower end of the arms which are spread apart and spring together to receive the shouldering means and retain the lighting fixture member, a ring slidably carried on the outer surface of the flexible arms to fix the latter against opening, and means on at least one arm proximate the jaw means to stop the locking ring in a position proximate the jaws.

7. A fixture support comprising a support including box anchorage means at one end, arms carried by the box anchorage means which are flexibly free at the ends thereof remote from the anchorage means, shoulders carried upon the flexibly free ends of the arms projecting inwardly therefrom at substantially 90°, a receptacle means formed by recessing the shoulders, the receptacle means having locking edges extending parallel to the direction of flex of the arms, a head adapted to be attached to a lighting fixture, a shouldering means which interlocks upon and over the shoulders of the receptacle means, and cooperating parallel flat surfaces upon the head engaging the locking edges of the receptacle means and retaining the head and support against rotation.

8. A fixture support comprising, a support including box anchorage means at one end, arms carried with the box anchorage means and so provided that the ends of the arms remote from the anchorage means are flexibly free, the flexibly free ends of the arms being bent inwardly at an angle of substantially 90°, a receptacle means formed by recessing the inwardly bent portions, locking edges formed by the receptacle means extending parallel to the direction of flex of the arms, a head, means to attach a lighting fixture to the head, a shouldering means carried by the head which interlocks upon and over the inwardly bent portions of the receptacle means, and parallel flat surfaces upon the head engaging the locking edges of the receptacle means to retain the parts against rotation.

9. A fixture support for an outlet box comprising a member having arms which are flexibly free at one end, receptacle means carried upon the flexibly free ends of each arm and extending between the arms, the receptacle means having locking edges extending parallel to the direction of flex of the arms, a head member, shouldering means carried thereby which interlock within the receptacle means upon the flexible arms, parallel flat surfaces on the head member engaging the locking edges and retaining the member against rotation, means to secure one of the members to a box, and means to secure a lighting fixture to the other member.

10. A fixture support for an outlet box comprising a member having flexible arms which are flexibly free at one end, an end portion of each flexibly free arm being bent inwardly at an angle of substantially 90°, receptacle means formed by recessing the inwardly bent portions, locking edges formed by the receptacle means in the edges of the recess which are parallel to the direction of flex of the arms, a head member, shouldering means carried thereby which interlock within the receptacle means upon the flexible arms, parallel flat surfaces on the head member engaging the locking edges and retaining the members against rotation, means to secure one of the members to a box, and means to secure a lighting fixture to the other member.

11. A fixture support comprising a supporting member having arms carried thereby and one end of each arm being flexibly free, the ends of the arms being bent inwardly through an angle exceeding 90° to form wedging shoulders, a head member having a wedging under-cut formed at substantially the same angle as the wedging shoulders and interlocking therewith, box anchorage means upon one of the members, and means to secure a fixture to the other member.

12. A fixture support comprising a supporting member having arms carried thereby and one end of each arm being flexibly free, means extending inwardly on the end of each arm forming a wedging shoulder having an acute angle, a head member having a wedging under-cut formed at substantially the same angle as the wedging shoulders and interlocking therewith, box anchorage means upon one of the members, and means to secure a fixture to the other member.

In testimony whereof I affix my signature.

STEPHEN N. BUCHANAN.